US012807473B2

(12) United States Patent
Penoyar et al.

(10) Patent No.: US 12,807,473 B2
(45) Date of Patent: Nov. 24, 2026

(54) THERMOPLASTIC HEAT MOLDABLE SADDLE PAD AND METHOD OF FORMING SAME

(71) Applicants: Patrick Penoyar, Shelton, WA (US); Dorothy Hrncir, Wasilla, AK (US)

(72) Inventors: Patrick Penoyar, Shelton, WA (US); Dorothy Hrncir, Wasilla, AK (US)

( * ) Notice: Subject to any disclaimer, the term of this patent is extended or adjusted under 35 U.S.C. 154(b) by 158 days.

(21) Appl. No.: 18/657,563

(22) Filed: May 7, 2024

(65) Prior Publication Data

US 2025/0346480 A1 Nov. 13, 2025

(51) Int. Cl.
*B68C 1/12* (2006.01)

(52) U.S. Cl.
CPC .................................... *B68C 1/12* (2013.01)

(58) Field of Classification Search
CPC ....................................................... B68C 1/12
See application file for complete search history.

(56) References Cited

U.S. PATENT DOCUMENTS 4,362,003 A * 12/1982 Robinson ................ B68C 1/027 54/44.1
2004/0237474 A1* 12/2004 Gregerson ............. B65B 47/02 53/453
2005/0001100 A1* 1/2005 Hsi-Wu .................... F17C 3/04 244/172.2
2009/0031679 A1* 2/2009 Braden ..................... B68C 1/12 54/66

FOREIGN PATENT DOCUMENTS

DE 102006039777 A1 * 2/2008 ............... B68C 1/12
WO WO-2017035645 A1 * 3/2017 ............... B68C 1/12

* cited by examiner

*Primary Examiner* — S. Behrooz Ghorishi

(57) ABSTRACT

A method for forming a saddle pad for an equine, comprising heating a thermoplastic heat-moldable foam to an internal temperature whereat the foam when placed into a three-dimensional contoured shape will maintain that contoured shape after the foam has cooled, placing the saddle with the heated foam therebelow on the back of the equine to at least partially contour the heated foam to the shape of the back of the equine thereunder and the shape of the underside of the saddle thereover, and placing a weight on the saddle until the foam cools to further contour the foam to the shape of the equine.

18 Claims, 7 Drawing Sheets

Process Overview

THERMOPLASTIC HEAT MOLDABLE SADDLE PAD AND METHOD OF FORMING SAME

BACKGROUND

Field of the Invention

This invention pertains to a product and method for crafting a saddle pad or saddle blanket designed to offer damping protection between a horse and a saddle.

Description of the Related Art

The present invention operates within the technical realm of equestrian saddle pads and saddle blankets. Saddle pads serve as a cushioning layer positioned between the horse's back and the saddle, functioning as a medium for distributing pressure to prevent the occurrence of symptomatic irritation, discoloration, or inflammation on the horse's back due to uneven pressure distribution from the saddle. Additionally, saddle pads contribute to stabilizing the saddle's position relative to the horse's back, thereby preventing slippage. Saddle pads are utilized across various equestrian disciplines and exhibit diversity in both material composition and design. They are often chosen based on the requirements of a specific discipline and the individual characteristics of horses.

However, conventional saddle pads possess limitations in that they primarily disperse pressure outwardly from areas of localized pressure, without adequately mitigating direct pressure transfer from these areas. Furthermore, existing saddle pads lack permanent adaptive molding properties that accommodate the unique characteristics of individual horse and saddle combinations.

DETAILED DESCRIPTION OF INVENTION

FIGS. 1-11 illustrate an exemplary molding system of the present invention and a thermoplastic heat-moldable finished saddle pad 10 that results. The finished saddle pad is an innovative product that enhances the fit, comfort, and connection between a saddle and a horse by utilizing fitted thermoplastic heat-moldable foam instead of a traditional saddle pad. This novel approach involves layering thermoplastic heat-moldable foam and employing a heat molding and fitting process to create a customized, permanently molded impression of both the contours of a horse's back and a specific saddle. The thermoplastic heat-moldable finished saddle pad serves as a unique medium that expands the surface area over which pressure from the saddle is distributed onto the back of the horse. By employing permanent negative, positive, and neutral molding of the pad in relation to the relative position and pressure distribution between the horse's back and the saddle, the finished saddle pad effectively reduces pressure localization, eliminating pressure points and promoting comfort for both horse and rider.

More specifically, the exemplary molding system focuses on a novel product and method for fabricating and molding saddle pads tailored to a specific horse and saddle combination. More precisely, the exemplary molding system utilizes thermoplastic or orthopedic, heat-moldable foam pads in conjunction with a heat molding process to produce a seamless medium for distributing pressure between a saddle and a horse's back. This medium effectively eradicates pressure points and sore spots on the animal, enhancing comfort and well-being.

Figure 1:
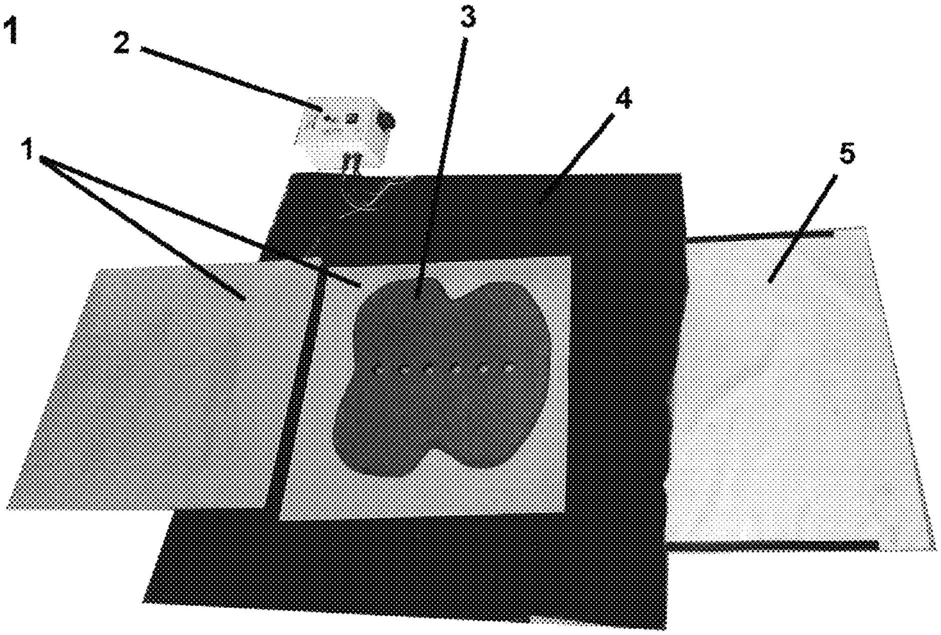
FIG. 1 is a perspective view of a heating unit with a thermoplastic foam exposed and not covered by silicone heating pads or insulation layers.

FIG. 1 shows two 1000 Watt silicone heating pads 1 for powering the heating process of the exemplary molding system and a heating unit 2. The heating unit includes a thermostat and temperature control designed to keep heating pad at between 100-150 °C. FIG. 1 also shows an unformed, heat moldable saddle pad 3 before heating and fitting, typically a flexible EVA (ethylene vinyl acetate) material. The unformed saddle pad 3 is cut to the perimeter shape desired from a thermoplastic heat-moldable foam uniform thickness, flat blank and shown positioned atop one of the silicone heating pads. As will be explained later, the formation process of the exemplary molding system has the saddle pad sandwiched between the silicone heating pads 1. FIG. 1 also shows a wool internal insulation 4 of 5 mm thickness that serves as an insulation layer, and an external kevlar/silicone outer insulation mesh 5 for protecting and insulating the silicone heating pads 1.

Figure 2:
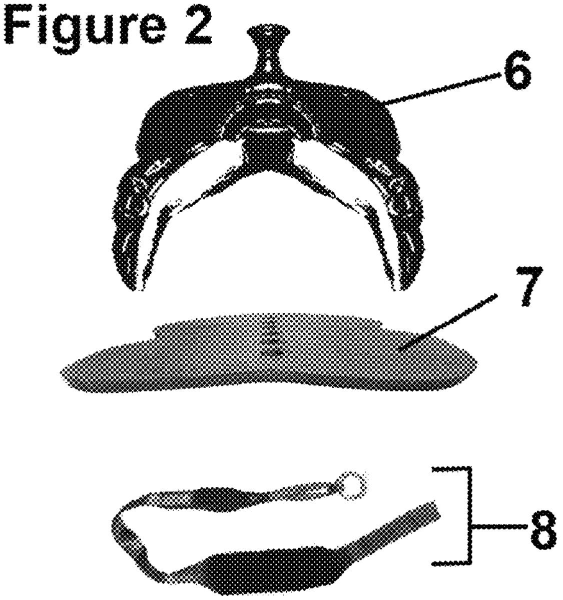
FIG. 2 is a front elevational view of the components of an exemplary molding system of the present invention before they are aligned and affixed to the saddle in readiness for the molding process.

FIG. 2 shows the components of the exemplary molding system before they are aligned and affixed to a saddle 6 illustrated as a standard Western saddle. The components are shown in readiness for the molding process. The unformed saddle pad 3 is shown before being heated and formed to the desired final three-dimensional shape. FIG. 2 also shows a gullet center strap 8 used during the molding process, as will be describe below and illustrated in FIG. 10.

Figure 3:
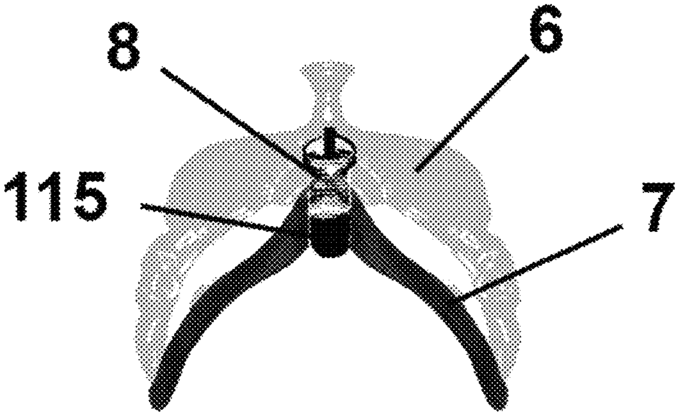
FIG. 3 is a front elevational view of the exemplary molding system of the present invention showing the positioning of the molding system, which involves aligning the heated pad centrally within the footprint of the saddle and applying tension to the gullet area through the use of an exemplary gullet strap.

FIG. 3 shows the positioning of the molding system, which involves aligning the now heated saddle pad 7 (still unformed) centrally within the underside portion of the saddle 6 and applying tension to the gullet area through the use of the gullet center strap 8 to pull the heated saddle pad upward. The saddle and heated unformed saddle pad with the gullet center strap attached are shown ready to be placed on a horse for molding.

Figure 4:
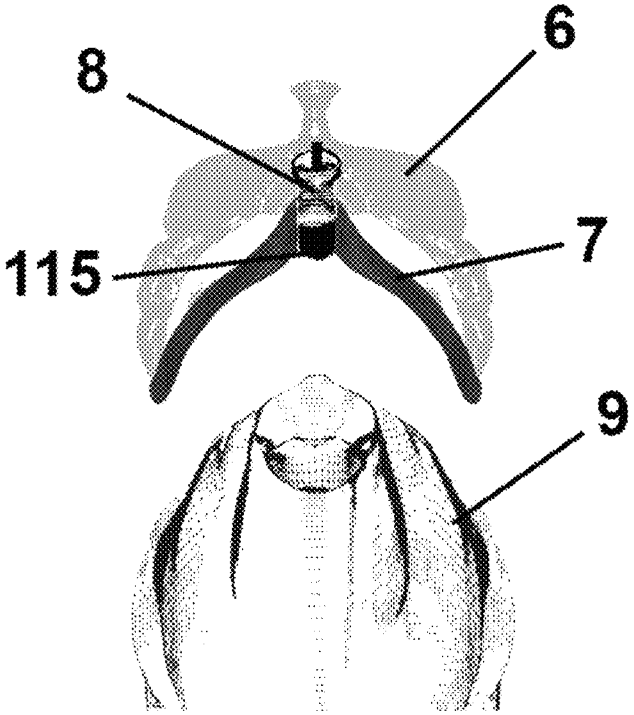
FIG. 4 is a front elevational view of the exemplary molding system of the present invention showing the configuration of the molding system prior to its placement on the horse.

FIG. 4 shows the heated saddle pad 7, saddle 6 and gullet center strap 8 assembly positioned above the back of a horse 9 prior to its placement on the horse. FIG. 4 shows a transverse view of the horse's barrel from the thoracic vertebrae, a transverse view of the heated saddle pad 7 before the molding process starts, and a transverse view of the saddle 6 intended for use in the molding process.

Figure 5:
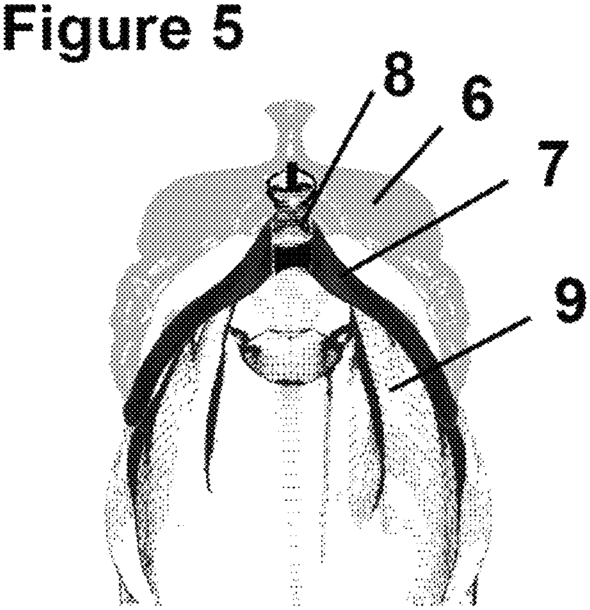
FIG. 5 is a front elevational view of the exemplary molding system of the present invention showing the molding system positioned on the horse.

FIG. 5 shows the heated saddle pad 7, saddle 6 and gullet center strap 8 assembly positions on the back of a horse 9 just prior to beginning the molding process. The gullet center strap is shown tightened as it is during the molding process.

Figure 6:
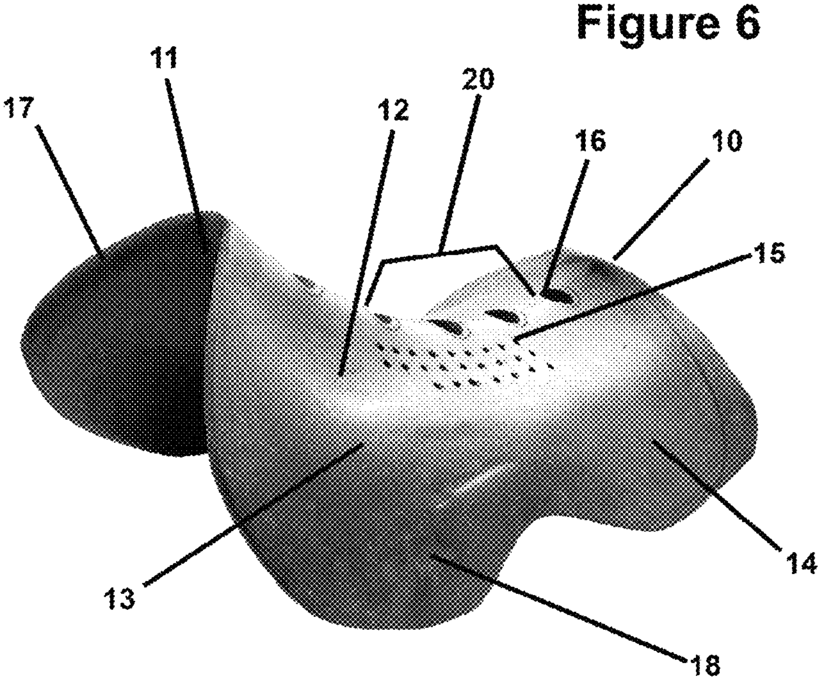
FIG. 6 is a perspective side view of a completed thermoplastic heat-moldable pad after the molding process is finalized.
Figure 7:
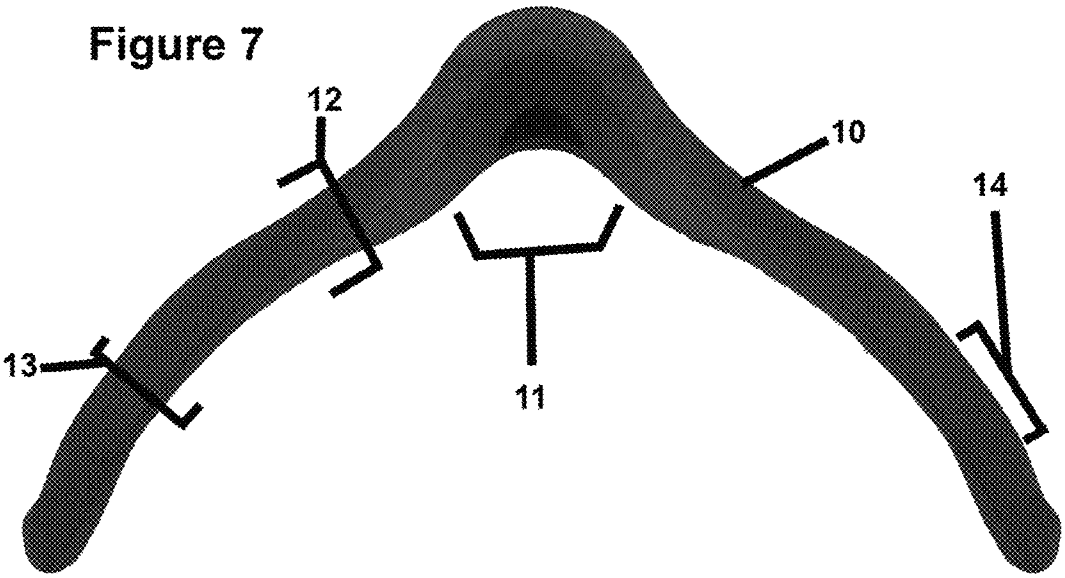
FIG. 7 is a front elevational view of the completed pad of FIG. 6.

FIG. 6 shows the thermoplastic heat-moldable finished saddle pad 10 that is formed by the molding process, and provides a comprehensive view of the pad's contour and shape following the molding process. The molding process results in a gullet negative space 11 allotted for the channel or gullet of the saddle 6. This space is designed to preserve a no contact zone along the spine of the horse. The finished saddle pad has a negative molding attribute 12 formed in the high pressure location of the saddle tree. A positive molding attribute 13 is exhibited on the finished saddle pad at locations of decreased pressure. A neutral molding attribute 14 is exhibited on the finished saddle pad where neutral pressure is present during the fitting process. These are also shown in FIG. 7.

A perforated grid area 15 is provided in the finished saddle pad 10 to increase breathability in a high pressure area. Gullet (channel) venting holes 16 are provided to keep the horse's spine dry. A 0.5 inch radius bevel 17 is exhibited on the full circumference of the finished saddle pad designed to decrease rubbing. Negative molding 18 is provided where girth strap rings are attached. An area 20 of noted curvature depicts the ability of the pad to mold to the contours of the horse's back and the saddle. The radius curvature of the horse's back is imprinted on the material when molding. This attribute can account for a range of horseback sway from normal to extreme sway back horses.

Figure 8:
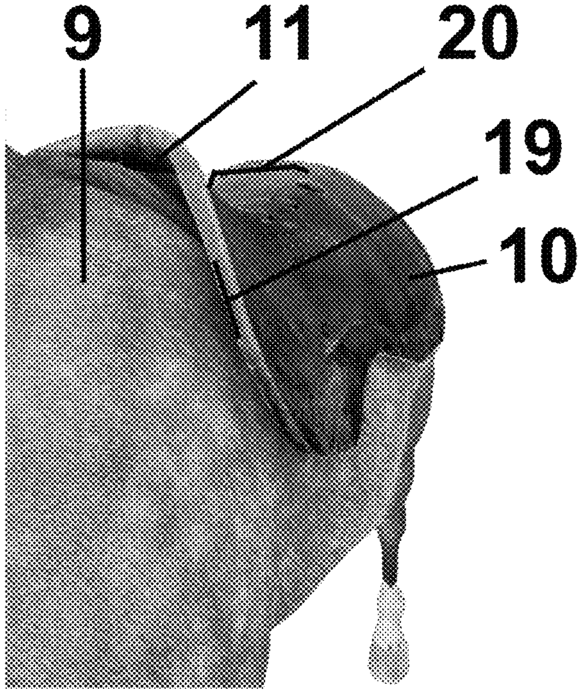
FIG. 8 is a front view of a completed pad made using the exemplary molding system of the present invention positioned on its designated horse.

FIG. 8 shows the thermoplastic heat-moldable finished saddle pad 10 positioned on the horse 9 and showcases the enduring characteristics resulting from the molding process.

Figure 9:
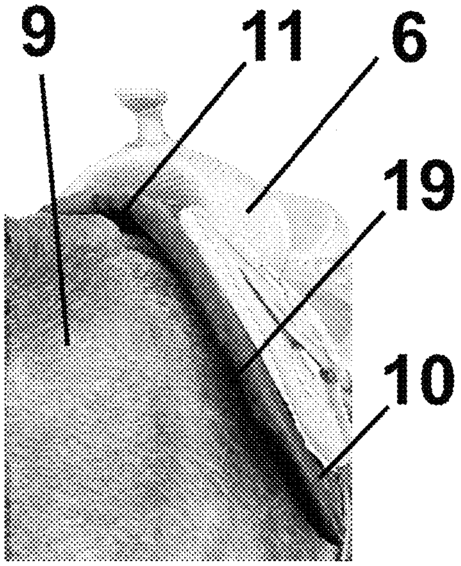
FIG. 9 is a front view of a completed pad made using the exemplary molding system of the present invention assembled with a saddle positioned on its designated horse.

FIG. 9 shows a front view of thermoplastic heat-moldable finished saddle pad 10 with the saddle 6 positioned on the horse 9, and illustrates the permanent characteristics/shapes of the finished saddle pad resulting from the molding process. An early pad rise 19 is shown on both the Caudal and Cranial side of the horse. The early pad rise decreases shoulder pinch by creating additional space for shoulder flexion.

Figure 10A:
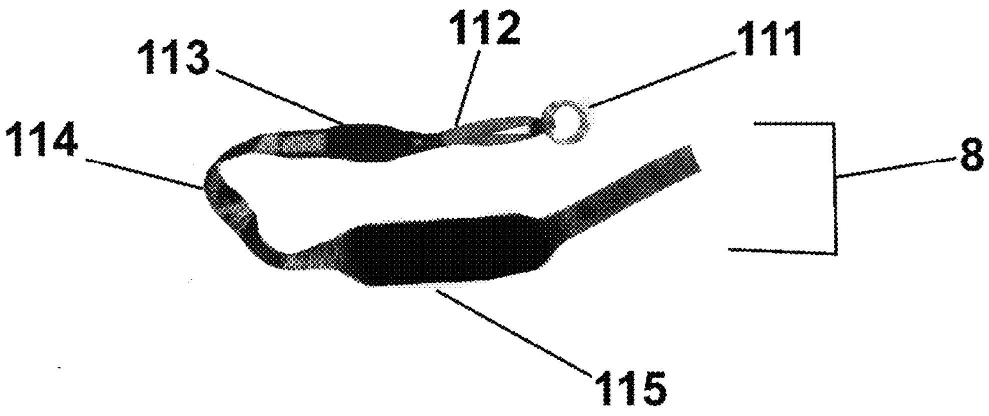
FIG. 10*a* shows the gullet strap.

FIG. 10*a* shows the exemplary gullet center strap 8 used in the molding process.

Figure 10B:
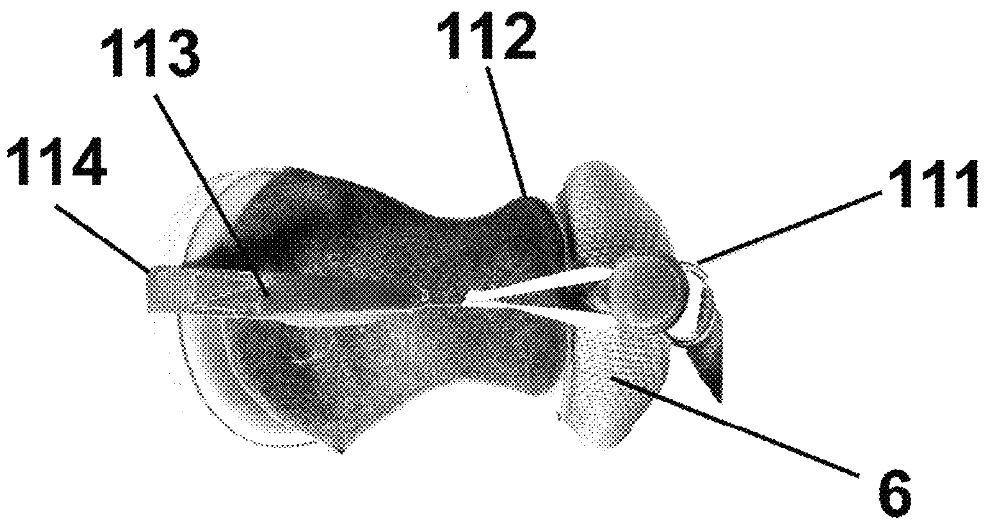
FIG. 10*b* shows the gullet strap affixed to a Western saddle.

FIG. 10*b* shows the gullet central strap 8 and how it is affixed to a Western saddle 6.

Figure 10C:
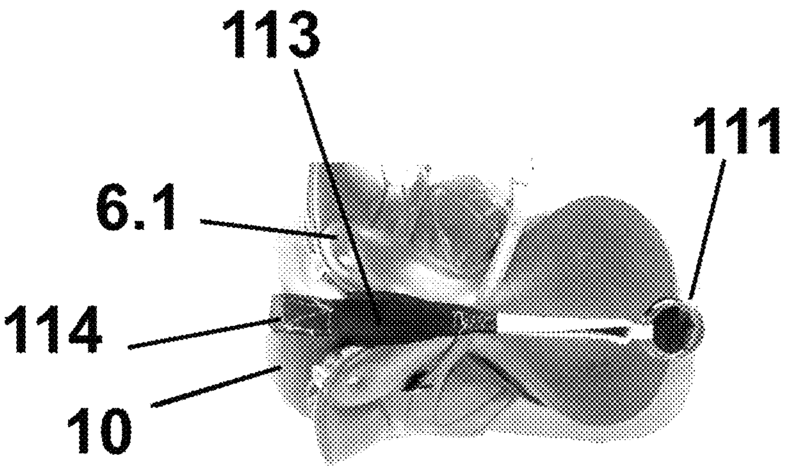
FIG. 10*c* shows the gullet strap affixed to an English saddle.

FIG. 10*c* shows the gullet central strap 8 and how it is affixed to an English saddle 6.1.

FIGS. 10*b* and 10*c* show a quick tightening attachment 111 for securing the gullet channel strap 8 and applying tension during fitting. Also, a loop strap 112 for torsional tension and attachment to a horn on Western saddles. The loop strap, that is a part of the gullet strap, is an inert fixture during English saddle fitting. In addition, an elastic band 113 for comfort of rider during the fitting process. A 2 inch webbing 114 is provided for increased tension on the gullet of the saddle. An expanded zone 115 (see FIG. 10*a*) of gullet strap is provided for creating the negative space in the gullet area during fitting.

Generally, FIGS. 1 through 5 illustrate the fitting process, and the characteristics of the thermoplastic heat-moldable finished saddle pad 10 are illustrated in FIGS. 6 through 9.

Figure 11:
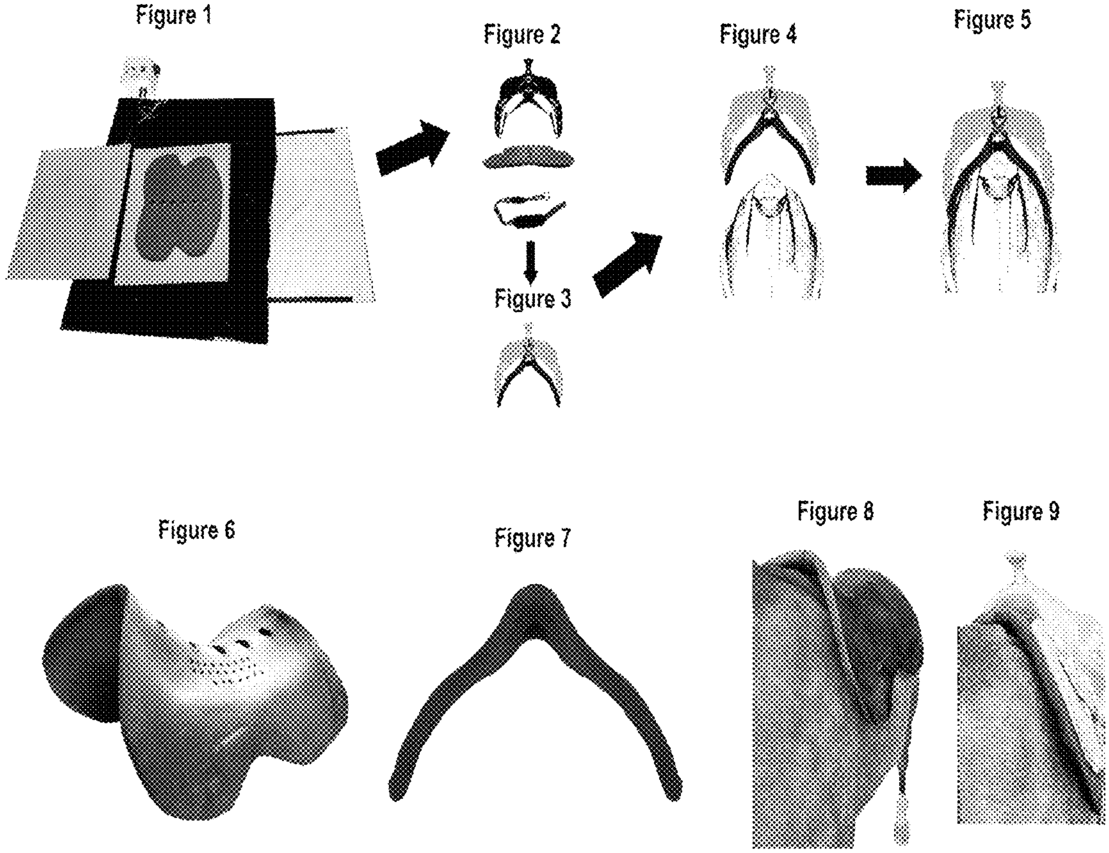
FIG. 11 illustrates an overview of the sequential steps of performing the exemplary molding system of the present invention.

FIG. 11 illustrates an overview of the sequential steps of performing the exemplary molding system for molding the thermoplastic heat-moldable finished saddle pad 10. As depicted in FIG. 1, the heating system is illustrated for the preparation of the unformed/unmolded saddle pad 3. During this stage, heating unit 2 is adjusted to preheat the silicone heating pads 1 to a preferred temperature range of 130-140 °C. The unformed saddle pad 3 is positioned between the two 1000 Watt silicone heating pads 1, fully encapsulated within the 5-10 mm thick layer of wool insulation 4, which is further encased in Kevlar outer insulation mesh 5. The unformed pad 3 remains within the heating unit 2 for a duration of 12-18 minutes, until it attains an internal temperature conducive to pliability for the subsequent molding process.

The subsequent phase of the molding process is depicted in FIG. 2. The heated saddle pad 7 is positioned centrally within the outline of the particular horse's saddle 6, ensuring that the gullet center strap 8 applies adequate upward pressure to delineate the gullet negative space 11 within the saddle channel, utilizing the expanded region 115 of the gullet center strap.

In the ensuing stage of the procedure, illustrated in FIG. 3, the heated saddle pad 7 is affixed in a position relative to the center of the saddle 6, employing tension exerted by the gullet center strap 8, which subsequently provides the gullet negative space 11 for the spine after the molding is complete.

Following the positioning of the molding system as depicted in FIG. 3, the system is subsequently aligned and centered on the horse's back, as shown in FIG. 4, ensuring proper placement of the saddle in its functional position on the body of the horse 9.

Upon achieving the appropriate positioning of the heated saddle pad 7, saddle 6 and securely fastened gullet center strap 8 assembly on the back of the horse 9 as shown in FIG. 5, a horse rider (typically the regular rider for the horse) is instructed to apply pressure to the assembly while it cools, typically for a duration of 12-15 minutes. Applying the pressure to the assembly typically involves the rider mounting the horse 9 and maintaining a balanced position in the saddle 6 throughout the requisite cooling period.

Turning attention to FIG. 6, the thermoplastic heat-moldable finished saddle pad 10 that is formed by the molding process typically using a flexible EVA (ethylene vinyl acetate) material, having undergone the molding process, now exhibits permanent conformity to the contours of a particular horse/saddle combination used in the molding process. The perforated grid area 15, preferably includes a grid of ventilation holes ranging from 2 to 4 mm in diameter and varying in density, is strategically positioned in high-pressure regions, notably in proximity to the saddle tree, to facilitate breathability. The presence of the perforation within the finished saddle pad enables ventilation of these high-pressure zones, thereby facilitating the dissipation of heat and moisture from the horse's back during use.

The efficacy and distinctiveness of the thermoplastic heat-moldable finished saddle pad 10 stem at least in part from the synergistic combination of three key molding properties. These properties are achieved through a fusion of the finished saddle pad's composition and the heat molding process.

The neutral molding attribute 14 entails the molding of the finished saddle pad 10 with minimal alteration in its thickness while potentially conforming to the curvature of a surface. This molding type arises from the absence of significant compression applied to the pad during the molding process. The neutral molding attribute 14 plays a pivotal role in augmenting shock absorption and mitigating saddle slippage relative to the horse during use. Additionally, it encompasses areas of the finished saddle pad that remain unpressed against the molding saddle during the heat molding procedure.

The positive molding attribute 13 is typically situated adjacent to regions of negative molding attribute 14 and arises from a reduction in pressure applied to the pad during the molding process. This molding type is characterized by minimal to no reduction in pad thickness and conforms closely to the contours of both the saddle and the horse's back. The positive molding attribute fills the spaces between the saddle and the horse's back, effectively transforming the thermoplastic heat-moldable finished saddle pad 10 into a supportive medium. This support medium serves to distribute pressure away from areas of localized pressure, as depicted in FIGS. 6 and 7, towards surrounding underutilized surfaces of both the saddle and the horse's back.

The negative molding attribute 12 manifests in regions between the saddle and the horse's back where localized pressure intensifies during the molding process. This molding type is distinguished by a permanent reduction in pad thickness and permanent adaptation to the contours of both the horse's back and the saddle. In practical application, negative molding serves to diminish contact between the saddle and the horse's back in areas of heightened pressure, thereby facilitating the partial distribution of localized pressure to surrounding surfaces.

The "no-contact" gullet negative space 11 represents a permanent zone devoid of contact positioned between the horse's spine and the gullet of the saddle. The absence of contact serves to offer relief and ventilation to the vertebrae spinal section of the horse. Furthermore, the no-contact gullet negative space ensures the dryness of the horse's spine by maximizing ventilation, in tandem with gullet venting holes 16.

The phenomenon of early pad rise, observed at locations of early pad rise 19 on both the front and rear of the horse's back, facilitates clearance and prevents the pad from rubbing against the perimeter of the finished saddle pad 10. This rise is a resultant attribute of pad stretching induced by the applied tension of the gullet center strap 8 during the molding process. The tension exerted by the gullet strap elevates the edges of the pad during the fitting process, and these raised edges become a permanent feature post-molding. Early pad rise effectively averts shoulder pinch by allowing ample space for the horse's shoulder to flex and move naturally under the rider's weight. Furthermore, it mitigates rubbing of the saddle due to hip flexion by ensuring no contact between the pad's edge and the horse's hips during use.

The culmination of the molding process reveals the permanent imprint of early pad rise 19, gullet negative space 11, as well as neutral molding attribute 14, negative molding attribute 12, and positive molding attribute 13 features on the thermoplastic heat-moldable finished saddle pad 10, as depicted in FIGS. 6, 7, 8, and 9. In reference to FIG. 6, the unformed saddle pad 3 has undergone the cooling phase and has been disengaged from both the molding surfaces of the back of the horse 9 and the saddle 6. At this final stage of the molding process, the pad is devoid of any external influencing forces and demonstrates the permanent incorporation of early pad rise 19, gullet negative space 11, as well as neutral 14, negative 12, and positive 13 molding attributes.

The above describes a groundbreaking method utilizing EVA thermoplastic, heat-moldable foam across the entire saddle footprint to establish a supportive framework around regions of localized pressure, addressing the distinctive asymmetrical muscle and bone development found in individual horses. This innovative approach significantly augments the potential surface area for effectively dispersing pressure between a saddle and a horse's back, thereby enhancing comfort and performance.

The described methodology for fitting a thermoplastic saddle pad guarantees the resulting product embodies permanent positive, negative, and neutral molding characteristics, tailored to suit the distinctive attributes of a particular horse-saddle pairing. This pioneering approach serves to optimize comfort, stability, and pressure distribution for both rider and horse.

The described methodology for fitting a thermoplastic saddle pad reliably achieves a final product characterized by permanent early pad rise and the establishment of a negative gullet space.

The described system is designed to center heated material accurately onto a saddle, ensuring precise alignment with the conforming channel (gullet) while preserving a designated no-contact zone. This novel strap mechanism optimizes the process of securing and positioning materials during saddle fitting, effectively preventing sweat accumulation along the spine.

The describe methodology yields a customized saddle pad with a permanent impression of the horse's back and the specific saddle contours. The thermoplastic heat-moldable saddle pad increases the surface area for distributing pressure from the saddle onto the horse's back, achieving a balanced pressure distribution. Through permanent negative, positive, and neutral molding, pressure localization is minimized, alleviating pressure points and enhancing comfort for both horse and rider.

The invention claimed is:

1. A method for forming a saddle pad for an equine, comprising:

a. heating a flat blank of a thermoplastic heat-moldable foam of uniform thickness, having a desired perimeter shape with front and rear perimeter edges, to an internal temperature whereat the heated thermoplastic heat-moldable foam blank when placed into a three-dimensional contoured shape will maintain that contoured shape after the heated thermoplastic heat-moldable foam blank has cooled;

b. attaching the heated thermoplastic heat-moldable foam blank to an underside of a saddle by a tensioned gullet strap that runs centrally under the saddle and the foam blank, and upwardly around front and rear ends of the saddle, to pull the foam blank toward the underside of the saddle and into a channel of the saddle and elevate the front and rear perimeter edges of the foam blank during the fitting process;

c. placing the saddle with the attached heated thermoplastic heat-moldable foam blank on the back of the equine to at least partially contour the heated foam blank to the shape of the back of the equine thereunder and the shape of the underside of the saddle thereover; and d. placing a weight on the saddle to further contour the heated thermoplastic heat-moldable foam blank to the shape of the back of the equine thereunder and the shape of the underside of the saddle thereover and not removing the weight until the heated thermoplastic heat-moldable foam blank cools sufficiently to maintain that contoured shape after the heated thermoplastic heat-moldable foam blank has cooled.

2. The method of claim 1, wherein the step of heating the thermoplastic heat-moldable foam blank includes placing the thermoplastic heat-moldable foam blank between two heating pads.

3. The method of claim 2, wherein during the heating of the thermoplastic heat-moldable thermoplastic heat-moldable foam blank, the two heating pads with the thermoplastic heat-moldable foam blank positioned therebetween are covered by an insulation layer.

4. The method of claim 3, wherein during the heating of the thermoplastic heat-moldable thermoplastic heat-moldable foam blank, the two heating pads with the thermoplastic heat-moldable foam blank positioned therebetween and covered by the insulation layer are positioned within a Kevlar outer mesh.

5. The method of claim 1, wherein the step of heating the thermoplastic heat-moldable foam blank heats the foam blank to an internal temperature in the range of 100 to 150 degrees centigrade.

6. The method of claim 1, wherein the step of heating the thermoplastic heat-moldable foam blank heats the foam blank to an internal temperature in the range of 130 to 140 degrees centigrade.

7. The method of claim 1, wherein the gullet strap runs centrally under the saddle and foam blank, upwardly around the front and rear ends of the saddle, and centrally over the saddle.

8. The method of claim 1, wherein the thermoplastic heat-moldable foam blank is provided with ventilation holes positioned toward a saddle tree of the saddle.

9. The method of claim 1, wherein the thermoplastic heat-moldable foam blank is comprised at least in part of ethylene vinyl acetate.

10. A method for forming a saddle pad for an equine, comprising:

a. heating a thermoplastic heat-moldable foam, having a desired perimeter shape with front and rear perimeter edges, to an internal temperature whereat the heated thermoplastic heat-moldable foam when placed into a three-dimensional contoured shape will maintain that contoured shape after the heated thermoplastic heat-moldable foam has cooled;

b. attaching the heated thermoplastic heat-moldable foam blank to an underside of a saddle by a tensioned gullet strap that runs centrally under the saddle and the foam blank, and upwardly around front and rear ends of the saddle, to pull the foam blank toward the underside of the saddle and into a channel of the saddle and elevate the front and rear perimeter edges of the foam blank during the fitting process;

c. placing the saddle with the attached heated thermoplastic heat-moldable foam on the back of the equine to at least partially contour the heated thermoplastic heat-moldable foam to the shape of the back of the equine thereunder and the shape of the underside of the saddle thereover; and d. placing a weight on the saddle to further contour the heated thermoplastic heat-moldable foam to the shape of the back of the equine thereunder and the shape of the underside of the saddle thereover and not removing the weight until the heated foam blank cools sufficiently to maintain that contoured shape after the heated thermoplastic heat-moldable foam has cooled.

11. The method of claim 10, wherein the step of heating the thermoplastic heat-moldable foam includes placing the thermoplastic heat-moldable foam blank between two heating pads.

12. The method of claim 11, wherein during the heating of the thermoplastic heat-moldable foam, the two heating pads with the thermoplastic heat-moldable foam positioned therebetween are covered by an insulation layer.

13. The method of claim 12, wherein during the heating of the thermoplastic heat-moldable foam, the two heating pads with the thermoplastic heat-moldable foam positioned therebetween and covered by the insulation layer are positioned within a Kevlar outer mesh.

14. The method of claim 10, wherein the step of heating the thermoplastic heat-moldable foam heats the thermoplastic heat-moldable foam to an internal temperature in the range of 100 to 150 degrees centigrade.

15. The method of claim 10, wherein the step of heating the thermoplastic heat-moldable foam heats the thermoplastic heat-moldable foam to an internal temperature in the range of 130 to 140 degrees centigrade.

16. The method of claim 10, wherein the gullet strap runs centrally under the saddle and foam blank, upwardly around the front and rear ends of the saddle, and centrally over the saddle.

17. The method of claim 10, wherein the thermoplastic heat-moldable foam is provided with ventilation holes positioned toward a saddle tree of the saddle.

18. The method of claim 10, wherein the thermoplastic heat-moldable foam is comprised at least in part of ethylene vinyl acetate.

* * * * *